United States Patent [19]

Lee

[11] Patent Number: 5,578,793
[45] Date of Patent: Nov. 26, 1996

[54] VIDEO CASSETTE RECORDER CHASSIS FRAME ASSEMBLY

[75] Inventor: Youn-Seong Lee, Seoul, Rep. of Korea

[73] Assignee: Daewoo Electronics Co., Ltd, Seoul, Rep. of Korea

[21] Appl. No.: 294,686

[22] Filed: Aug. 23, 1994

[30]  Foreign Application Priority Data

Aug. 24, 1993 [KR] Rep. of Korea .................. 1993-16469

[51] Int. Cl.[6] .............................. H05K 5/00; H05K 1/14
[52] U.S. Cl. ......................... 174/52.1; 361/736; 361/752
[58] Field of Search .............................. 174/52.1, 52.4; 361/752, 728, 736; 206/312, 320, 328; 220/4.02; 360/85

[56]  References Cited

U.S. PATENT DOCUMENTS

| | | | |
|---|---|---|---|
| 4,791,531 | 12/1988 | Jessup | 361/752 X |
| 4,985,845 | 1/1991 | Götz et al. | 361/752 X |
| 5,110,004 | 5/1992 | Albanesi et al. | 220/4.02 X |

*Primary Examiner*—Bot L. Ledynh
*Attorney, Agent, or Firm*—Anderson, Kill & Olick P.C.

[57]  ABSTRACT

A video cassette recorder is structured to have the skirt plates within its chassis frame, which extend toward the bottom cover and the main printed circuit board situated between the skirt plates at a location farther from the plate portion of the chassis frame than from its deck, with the pattern surface of the main printed circuit board facing the bottom cover.

1 Claim, 4 Drawing Sheets

VIDEO CASSETTE RECORDER CHASSIS FRAME ASSEMBLY

FIELD OF THE INVENTION

The present invention is directed to a video cassette recorder(VCR); and, more particularly, to an improved VCR structure comprising a chassis frame wherein a main printed circuit board is strategically located so as to improve the efficiency in the VCR manufacturing line and also to facilitate the repair with thereof.

DESCRIPTION OF THE PRIOR ART

The main PCB provided within a VCR has two principle surfaces: one surface whereon the electronic components are mounted; and the other, which is often called "pattern surface", wherein the electric circuit built with, e.g., copper is soldered for fixedly connecting the electronic components to the circuit. In a VCR manufacturing process, the pattern surface of the main PCB is subjected to regular inspection or testing to sort out defective assembling. Further, in carrying out after-sales services, it is often necessary to check the pattern surface of the main PCB in a malfunctioning VCR.

In FIG. 1, there is schematically shown a prior art VCR structure including a top cover 10, a bottom cover 20 and a chassis frame 30 consisting of a plate portion 31 and a pair of skirt plates 32 and 33, each upwardly extending from lateral edges of the plate portion 31. The chassis frame 30 is provided with a main PCB 40 and a deck 50 which are arranged between the skirt plates 32 and 33. The main PCB 40 is positioned between the plate portion 31 of the chassis frame 30 and the deck 50, with its pattern surface 41 indicated with a thick solid line facing toward the plate portion 31.

Owing to the main PCB configuration described above, it is rather cumbersome to manufacture or repair the VCR having the structure shown in FIG. 1, however. Specifically, since the inspector cannot gain a direct access to the pattern surface once the main PCB has been assembled into the chassis frame, detaching of the main PCB from the chassis frame is necessary to perform the inspection or testing on the pattern surface, thereby lowering the production efficiency. Similarly, for after-sales services, the repairman cannot reach the pattern surface of a faults VCR without removing the top cover and the deck from the VCR and then turning over the main PCB.

SUMMARY OF THE INVENTION

It is, therefore, a primary object of the invention to provide a VCR having its main PCB so located to facilitate the assembly line testing or repair work thereof.

The above and other objects of the present invention are accomplished by providing a VCR of the type comprising a top cover, a bottom cover and a chassis frame containing a plate portion and a pair of skirt plates, each of said skirt plates extending from a lateral edge of the plate portion, said chassis frame further containing a deck and a main printed circuit board having a pattern surface between the skirt plates, said video cassette recorder characterized in that:

said skirt plates extend toward the bottom cover and the main printed circuit board is mounted between the skirt plates at a position farther from the plate portion than from the deck, with the pattern surface of the main printed circuit board facing toward the bottom cover.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

Figure 1:
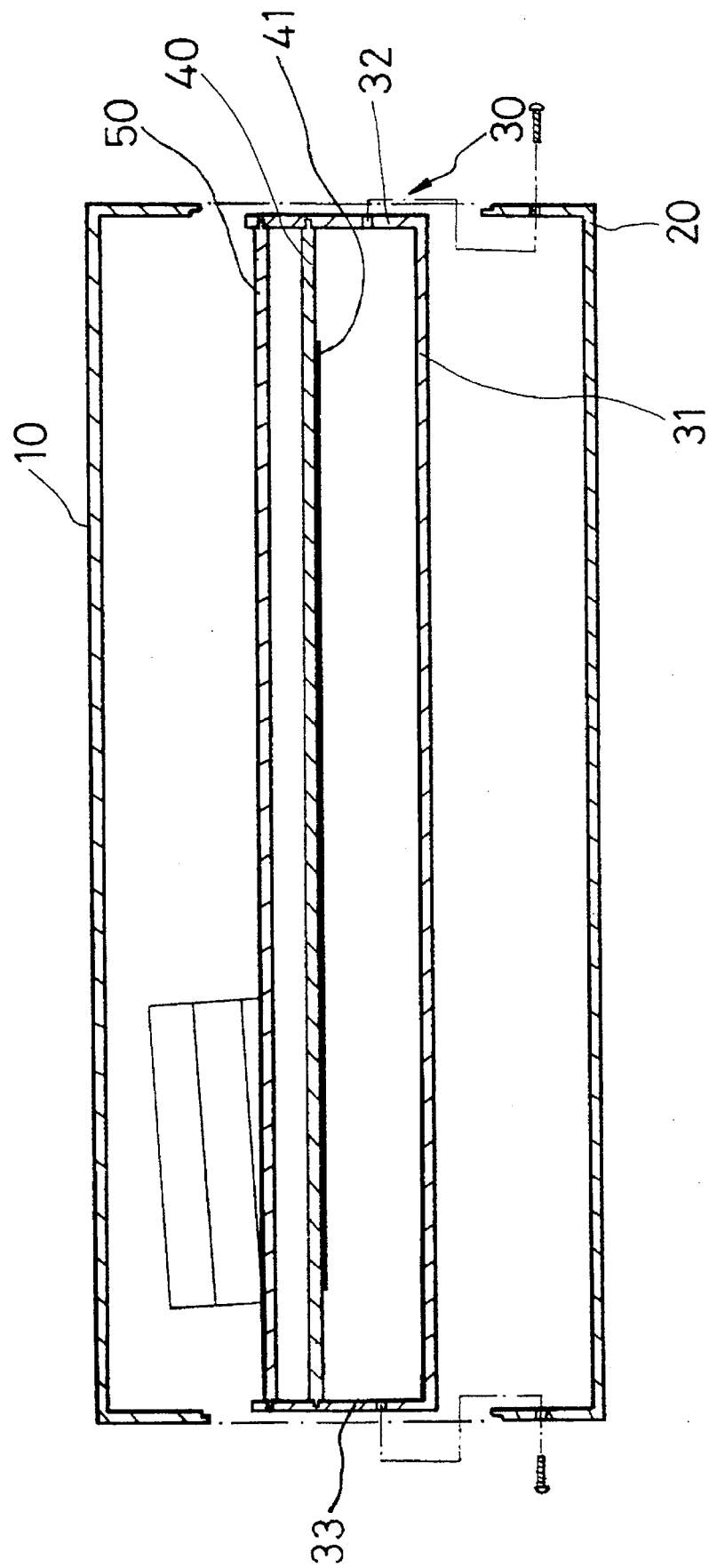
FIG. 1 is a sectional view of a prior art VCR having its main PCB surrounded with a deck and a chassis frame.
Figure 2:
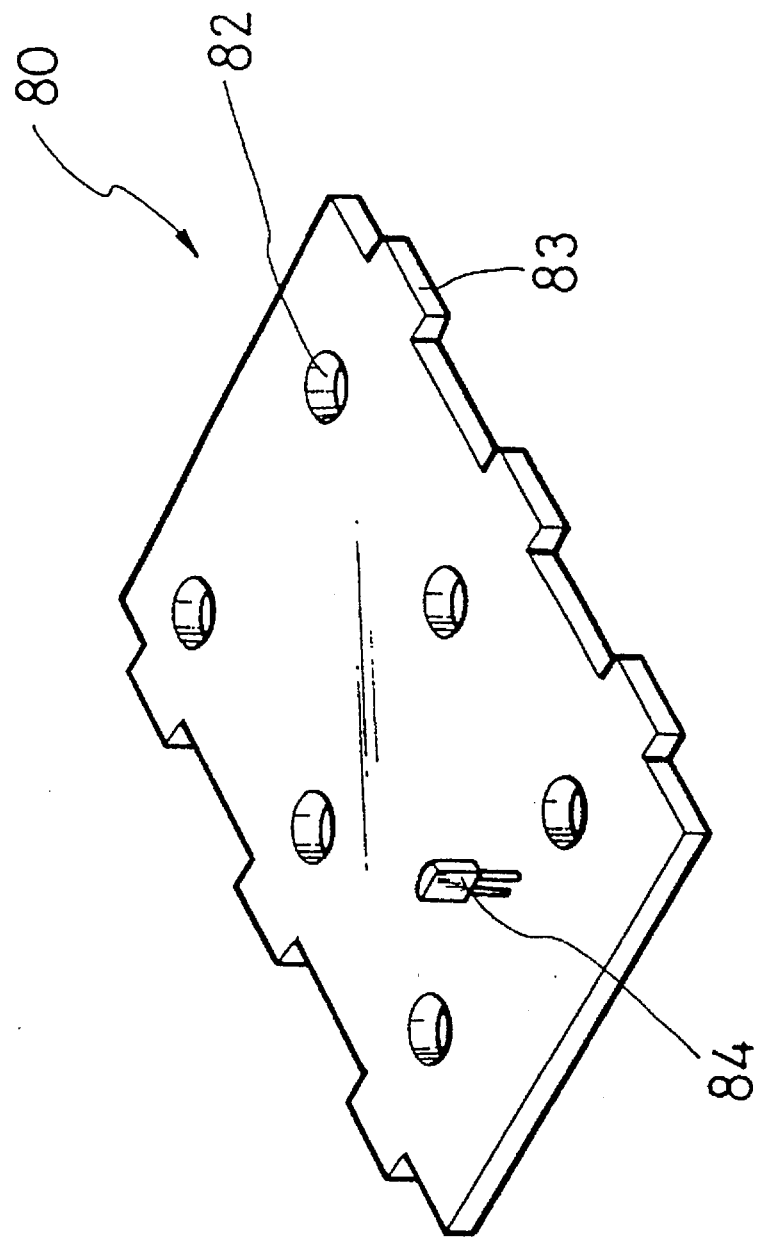
FIG. 2 illustrates a perspective view of the main PCB.

Referring to FIG. 2, the main printed circuit board(PCB) 80 employed in one embodiment of the present invention is schematically shown to have a number of lugs 83 sidewardly protruding from two lateral edges thereof and two rows of a number of through-holes 82 formed therethrough, which are in substantially parallel relationship with each other. A bottom surface of the PCB 80, as hidden from view, is a pattern surface, wherein the electric circuit is soldered for fixedly connecting electronic components(only one shown) 84 to the circuit.

Referring to FIG. 3A, there is shown a VCR structure 100 in accordance with the present invention, which is dismantled to show a top cover 60, a bottom cover 90 and a chassis frame 70 provided with a deck 72 and the main PCB 80. The chassis frame 70 has a pair of skirt plates 71, each extending from a lateral edge of a plate portion 69 of the chassis frame 70 toward the bottom cover 90. As shown, the main PCB 80 is located in vicinity of end portions of the skirt plates 71, with its pattern surface 81 facing toward the bottom cover 90.

The skirt plate 71 has a number of stoppers 73 horizontally aligned on two lateral external surfaces thereof, as best illustrated in FIG. 3B. An upper portion 73a of the stopper 73 is adapted to provide room for supporting the top cover 60, a lower portion 73b of the stopper 73 forming a space for receiving the bottom cover 90, so that the stoppers 73 connect the chassis frame 70 with the bottom cover 90 and the top cover 60, respectively. Each skirt plate 71 has as many tongues 79 as the number of lugs 83 of the main PCB 80 in FIG. 2 at its free end.

Further, two arrays of bosses 75 for receiving the deck 72 and for joining the chassis frame 70 to the bottom cover 90, extend from the plate portion 69 in the same direction as the skirt plates 71 in substantially parallel relationship with the latter. Reference numeral 74 refers a head drum assembly.

Figure 3:
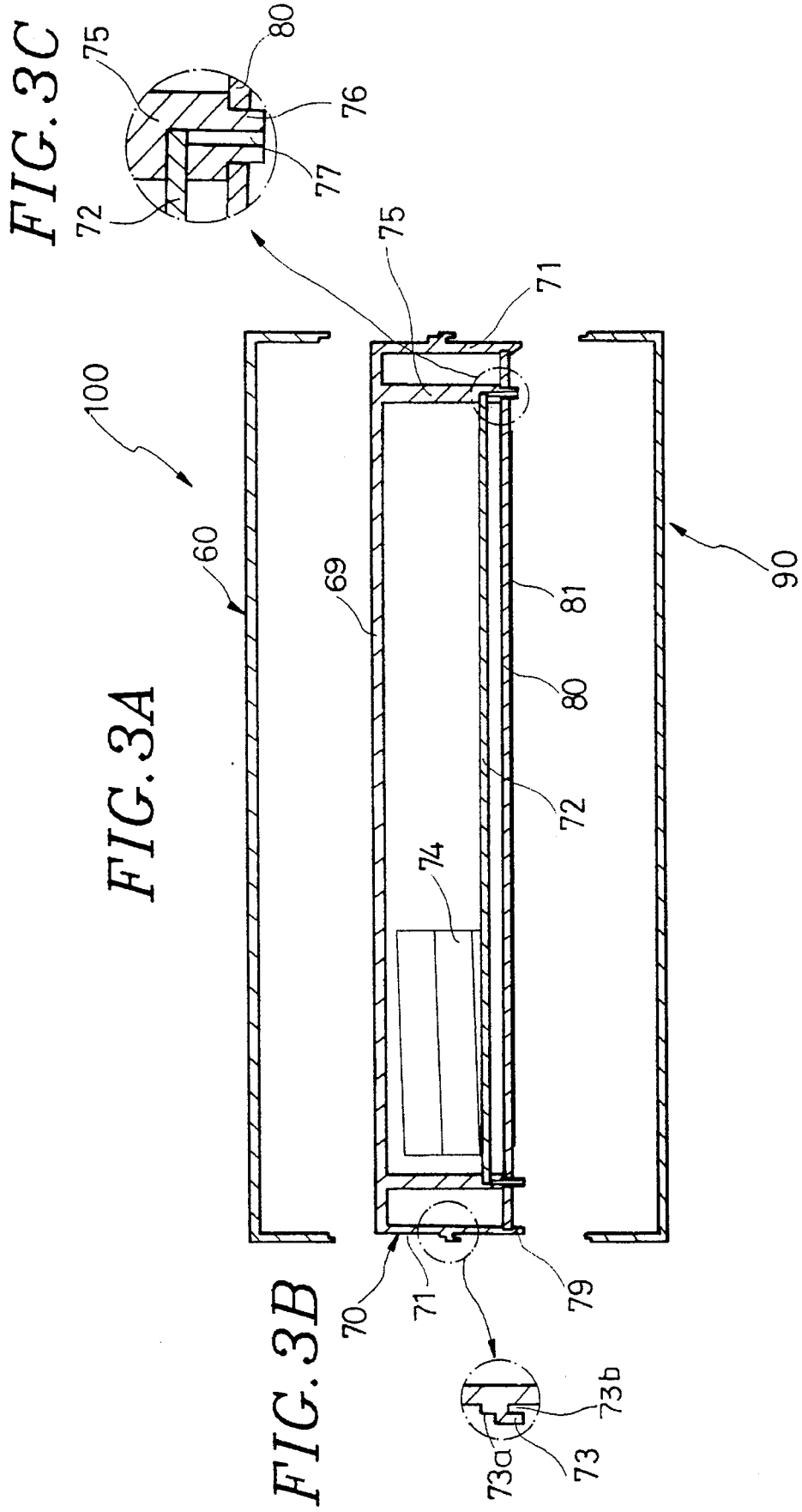
FIGS. 3A to 3C show a VCR in accordance with the present invention wherein the pattern surface of the main PCB is exposed outside of a chassis frame.
Figure 4:
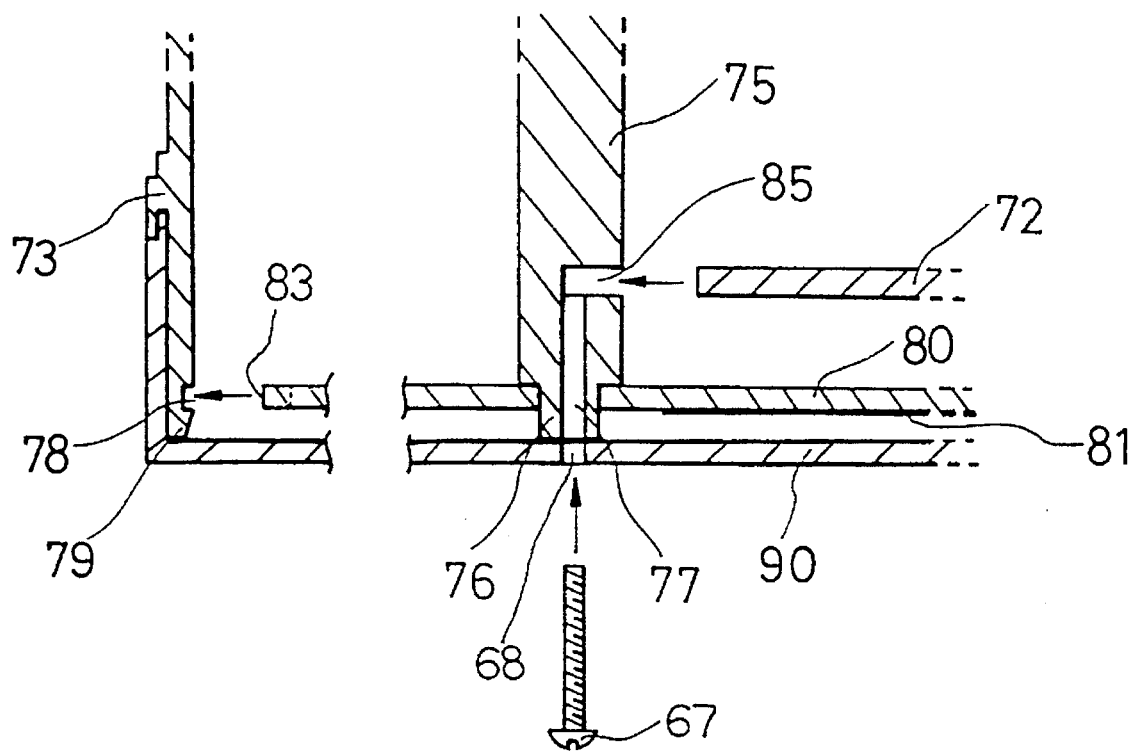
FIG. 4 represents a partially enlarged sectional view of a deck, the main PCB and a bottom cover contained in the chassis frame.

More detailed description of the boss 75 will now be made in reference to FIGS. 3C and 4. Each arrays containing a same number of bosses 75 as that of the through-holes 82 of the main PCB 80. Each of said bosses 75 has a groove 85 transversely sunken from a lateral surface thereof and adapted to receive a lateral edge of the deck 72. Each boss 75 further has a distal portion 76 having a cross sectional area smaller than that of the through-hole 82 of the main PCB 80 and adapted to pass through one of the through-holes 82, said portion 76 of the boss 75 containing a blind threaded hole 77 in the longitudinal direction.

Figure 5:
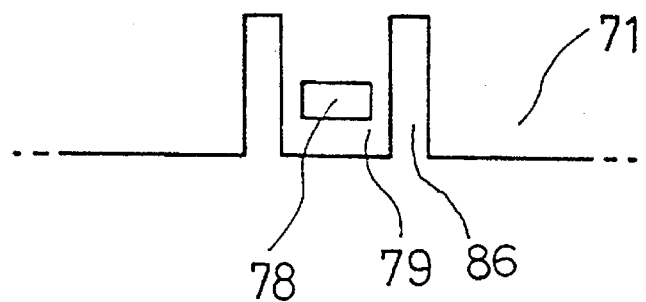
FIG. 5 represents a fragmentary view of tongues formed at an end side of the skirt plates within the chassis frame.

FIG. 5 shows a fragmentary view of the tongues 79 of the chassis frame 70. The chassis frame 70 has a same number of tongues 79 as that of the lugs 83, horizontally arranged for alternating with cut-out portions 86 at an end side of the skirt plates 71. Each of the tongues 79 has a recess 78 subsided from the surface facing opposite the skirt plate 71. The recess 78 is positioned to have a farther distance from the plate portion 69 than the groove 85 of the boss 75.

A combined incorporation of the deck 72 and the main PCB 80 within the chassis frame 70 in accordance with the present invention will now be explained in reference to FIGS. 3 and 4. As best illustrated in FIG. 4, lateral edges of the deck 72 are closely fitted into boss grooves 85 of the chassis frame 70 and the main PCB 80 is mounted for permitting the pattern surface 81 thereof to face toward the bottom cover 90, between the skirt plates 71 by the lug 83 and the recess 78. As a result, the pattern surface 81 is held exposed to the outside of the chassis frame 70 so that the repairman or the worker in the assembly/inspection line can have a direct access to the pattern surface 81 once the bottom cover 90 is separated from the chassis frame 70.

On the other hand, the bottom cover 90 is structured to have the apertures 68 corresponding to the threaded-hole 77 of the boss 75, it can be readily separated from or joined with the chassis frame 70 by employing a thread 67.

Although the invention has been shown and described with respect to the preferred embodiments, it will be understood by those skilled in the art that various changes and modifications may be made without departing from the spirit and scope of the invention as defined in the following claims.

What is claimed is:

1. A video cassette recorder of the type comprising a top cover, a bottom cover and a chassis frame having a plate portion and a pair of skirt plates extending from both lateral edges of the plate portion, said chassis frame containing a deck and a main printed circuit board between the skirt plates, the main printed circuit board having a pattern surface, said video cassette recorder characterized in that:

the main printed circuit board is mounted between the skirt plates at a position farther from the plate portion than from the deck, with the pattern surface of the main printed circuit board facing toward the bottom cover, the main printed circuit board having a number of lugs sidewardly protruding from two lateral edges thereof and two rows of a number of through-holes formed therethrough, which are in substantially parallel relationship with the skirt plates;

the skirt plates of the chassis frame extend toward the bottom cover and the chassis frame has a same number of tongues as that of the lugs, which are horizontally arranged for alternating with cut-outs provided at one end side of the skirt plates, each of said tongues having a recess on its inner surface so that each of the lugs is closely fitted into each of the recesses, two arrays of bosses extending from the plate portion toward the bottom cover, each array containing a same number of bosses as that of the through-holes in each of the two rows, each of said bosses including a groove adapted to receive a lateral edge of the deck and a distal portion having a longitudinally threaded hole, said distal portion adapted to pass through one of the through-holes, and the chassis frame has a number of stoppers which are horizontally aligned on two lateral external surfaces of the skirt plates so as to connect the chassis frame with the bottom cover and the top cover; and the bottom cover has as many apertures as the number of bosses, corresponding to the threaded holes, so that the deck is fitted through the grooves and the chassis frame is joined with the bottom cover by a thread.

* * * * *